US012663793B2

(12) United States Patent
Chae et al.

(10) Patent No.: US 12,663,793 B2
(45) Date of Patent: Jun. 23, 2026

(54) METHOD AND SYSTEM FOR REMOTE CONTROL OF ROBOT, AND BUILDING HAVING ELEVATORS FOR ROBOTS

(71) Applicant: NAVER LABS CORPORATION, Seongnam-si (KR)

(72) Inventors: Su Won Chae, Seongnam-si (KR); Ka Hyeon Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 18/490,485

(22) Filed: Oct. 19, 2023

(65) Prior Publication Data

US 2024/0045432 A1      Feb. 8, 2024

Related U.S. Application Data

(63) Continuation of application No. PCT/KR2021/020109, filed on Dec. 29, 2021.

(30) Foreign Application Priority Data

Apr. 21, 2021   (KR) ........................ 10-2021-0051858
Jun. 23, 2021   (KR) ........................ 10-2021-0081915

(51) Int. Cl.
*G05D 1/00*          (2006.01)
*B66B 1/34*          (2006.01)
(52) U.S. Cl.
CPC ......... *G05D 1/0214* (2013.01); *B66B 1/3446* (2013.01); *B66B 1/3476* (2013.01); *G05D 1/0217* (2013.01)

(58) Field of Classification Search
None
See application file for complete search history.

(56) References Cited

U.S. PATENT DOCUMENTS

2019/0177121 A1 *   6/2019   Shah ...................... B66B 5/0012
2022/0017332 A1 *   1/2022   Kim ........................ B66B 13/14
(Continued)

FOREIGN PATENT DOCUMENTS

JP        08026611 A       1/1996
JP        6308341 A        4/2018
(Continued)

OTHER PUBLICATIONS

KR 20210019341 A Espacenet English translation of the description (Year: 2021).*
(Continued)

*Primary Examiner* — Adam D Tissot
*Assistant Examiner* — Laura E Linhardt
(74) *Attorney, Agent, or Firm* — Greer Burns & Crain Ltd.

(57) ABSTRACT

A method for remote control of a robot includes specifying a target robot for which a boarding event with respect to a movement means has occurred; controlling driving of the target robot in response to the movement means stopping at a specific area where the target robot is located so that the target robot boards the movement means; on the basis of an occupation state of a reception space provided in the movement means, determining a target occupation position of the target robot in the reception space; and transmitting a control command related to the target occupation position to the target robot so that the target robot moves to the target occupation position.

20 Claims, 25 Drawing Sheets

(56)          References Cited

U.S. PATENT DOCUMENTS

| | | | | |
|---|---|---|---|---|
| 2022/0234194 A1* | 7/2022 | Deyle | ....................... | B25J 18/04 |
| 2023/0039466 A1* | 2/2023 | Sternitzke | .............. | B66B 1/468 |

FOREIGN PATENT DOCUMENTS

| | | | | | |
|---|---|---|---|---|---|
| JP | 2018147081 | A | 9/2018 | | |
| JP | 2020506129 | A | 2/2020 | | |
| JP | 2020128279 | A | 8/2020 | | |
| KR | 1020090032130 | A | 3/2009 | | |
| KR | 20090057867 | A | 6/2009 | | |
| KR | 101287699 | B1 | 7/2013 | | |
| KR | 20210019341 | A * | 2/2021 | .............. | B66B 1/24 |
| KR | 1020210019341 | A | 2/2021 | | |
| WO | WO-2018066056 | A1 * | 4/2018 | .............. | B66B 1/14 |

OTHER PUBLICATIONS

WO 2018066056 A1 Espacenet English translation of the description (Year: 2018).*
Office action issued in corresponding JP application No. 2023-562174, dated Aug. 20, 2024.

\* cited by examiner

FIG. 1

METHOD AND SYSTEM FOR REMOTE CONTROL OF ROBOT, AND BUILDING HAVING ELEVATORS FOR ROBOTS

CROSS-REFERENCE TO RELATED APPLICATIONS

This is a continuation application of International Application No. PCT/KR2021/020109, filed Dec. 29, 2021, which claims the benefit of Korean Patent Application Nos. 10-2021-0051858, filed Apr. 21, 2021 and 10-2121-0081915 filed Jun. 23, 2021.

BACKGROUND OF THE INVENTION

Field of Invention

The present invention relates to a method and system for remotely controlling a robot using a movement means.

Description of Related Art

With the advancement of technology, various service devices are emerging, particularly in recent times, there has been active development of technology for robots that perform various tasks or services.

Further, recently, with the development of artificial intelligence technology, cloud technology, etc., the utilization of robots is gradually increasing.

In order to provide various tasks or services with robots, it is important to control the robots accurately. In the case of the robots, there is a practical limitation for a user to perform control of the robot individually. Therefore, the need for technology to remotely control the robot is becoming increasingly important.

Further, in order to provide various tasks or services with the robot, there needs to be less restrictions on the space where the robot moves. To this end, various research activities have been carried out in recent years to enable the robot to ride on a movement means, such as an elevator, a car, an electric cart, etc.

For example, Korean Patent Application Laid-open No. 2009-0057867 (Moving robot device, elevator administration device, and system and method for controlling elevator inter-floor movement of the moving robot) discloses a method of controlling a robot to board an elevator by performing central control over the elevator and the robot.

Meanwhile, as described above, when the robot is on board the movement means, various considerations in terms of the robot and space need to be made on how to efficiently operate a reception space of the movement means.

BRIEF SUMMARY OF THE INVENTION

The present invention is directed to providing a method and system for remotely controlling robots. More specifically, the present invention is directed to providing a method and a system for more efficiently controlling a robot boarding a movement means.

Further, the present invention is directed to providing a method and a system for efficiently controlling the waiting and the movement of a robot within a movement means, both in terms of energy and time.

Further, the present invention is directed to providing a method and a system for remotely controlling a robot that is capable of operating in a reception space of a movement means more efficiently.

Furthermore, the present invention is directed to providing a method and a system for remotely controlling a robot such that a human and a robot can safely coexist within a movement means.

There is provided a method of remotely controlling a robot according to the present invention, the method may include: specifying a target robot for which a boarding event for a movement means has occurred; controlling traveling of the target robot, in response to the movement means stopping at a specific area where the target robot is positioned, such that the target robot boards the movement means; determining, based on an occupation state of a reception space provided in the movement means, a target occupation position of the target robot in the reception space; and transmitting a control command related to the target occupation position to the target robot, such that the target robot moves to the target occupation position.

Further, there is provided a system for remotely controlling a robot, the system may include: a sensing unit; a communication unit; and a control unit configured to specify a target robot for which a boarding event for a movement means has occurred, in which the control unit may be configured to: control traveling of the target robot, in response to the movement means stopping at a specific area where the target robot is positioned, such that the target robot boards the movement means; determine, based on an occupation state of a reception space provided in the movement means, a target occupation position of the target robot in the reception space; and transmit a control command related to the target occupation position to the target robot using the communication unit, such that the target robot moves to the target occupation position.

Further, there is provided a program executed by one or more processes and capable of being stored on a computer-readable recording medium, the program may include instructions to perform the steps of: specifying a target robot for which a boarding event for a movement means has occurred; controlling traveling of the target robot, in response to the movement means stopping at a specific area where the target robot is positioned, such that the target robot boards the movement means; determining, based on an occupation state of a reception space provided in the movement means, a target occupation position of the target robot in the reception space; and transmitting a control command related to the target occupation position to the target robot, such that the target robot moves to the target occupation position.

As described above, a method and a system for remotely controlling a robot according to the present invention can determine an occupation position of a robot within a movement means based on an occupation state of the movement means. More specifically, according to the present invention, a risk of collision by a robot with another robot or a human can be reduced by setting an occupation position of the robot such that the occupation position of the robot does not overlap a region occupied by a robot or a human who is already on board the movement means.

Further, the method and the system for remotely controlling a robot according to the present invention can set an occupation position of the robot in consideration of an occupation state of the movement means and information on boarding and deboarding of other robots or humans.

In this case, in the present invention, energy efficiency of the robot can be maximized by setting an occupation position that allows the robot to move the shortest distance within the movement means to board and deboard the movement means.

In contrast, in the present invention, time efficiency of the robot can be maximized by setting an occupation position that allows the robot to move in the shortest possible time to deboard the movement means.

Furthermore, the method and the system for remotely controlling a robot, according to the present invention, can assist other robots to deboard the movement means while reducing complexity of a movement space by resetting the occupation position of the robot based on deboarding information on the other robots on board the movement means.

BRIEF DESCRIPTION OF THE DRAWINGS

Figure 1:
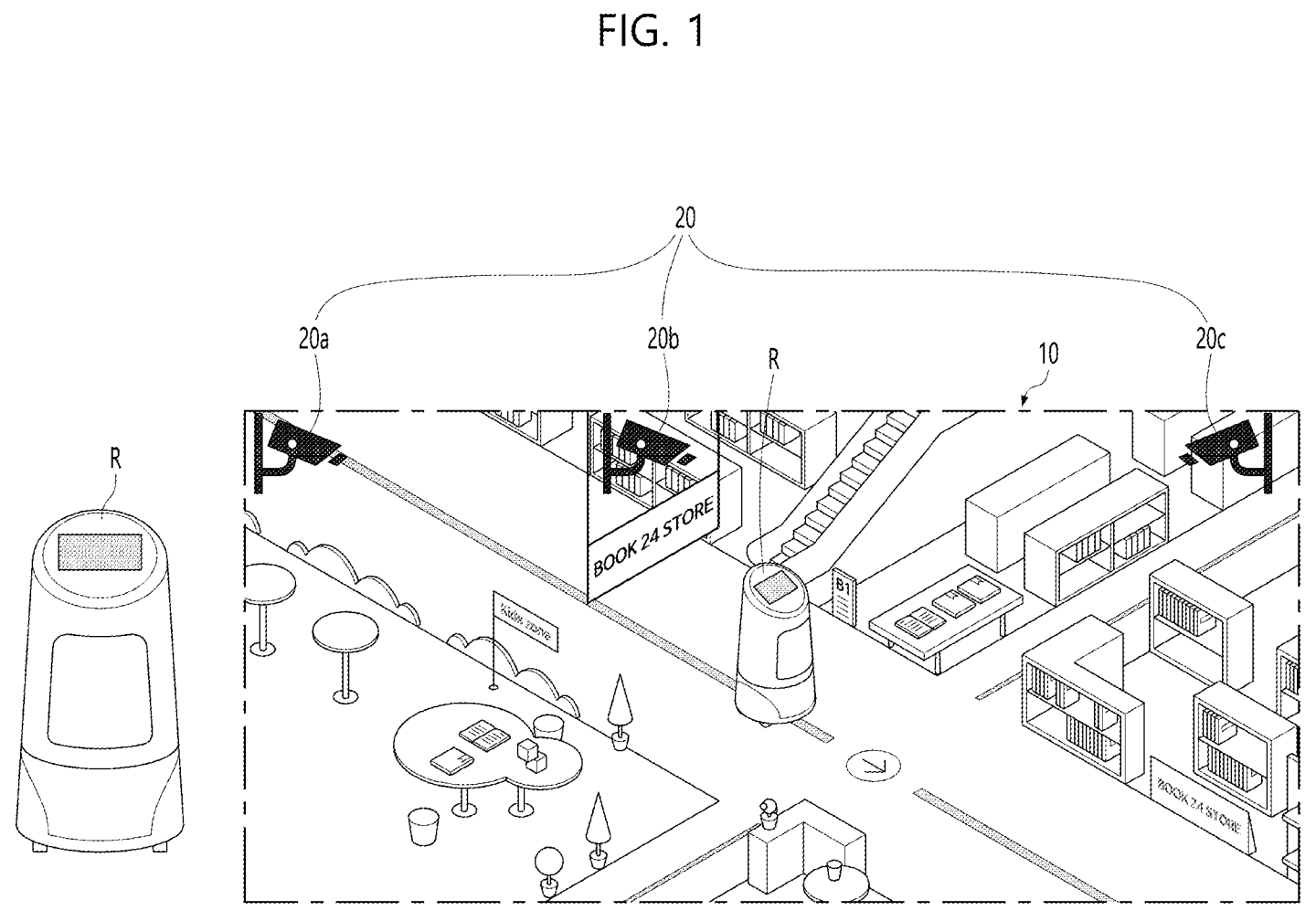

FIGS. 1 and 2 are diagrams for illustrating a method and a system for remotely controlling robots according to the present invention.

DETAILED DESCRIPTION OF THE INVENTION

Figure 2:
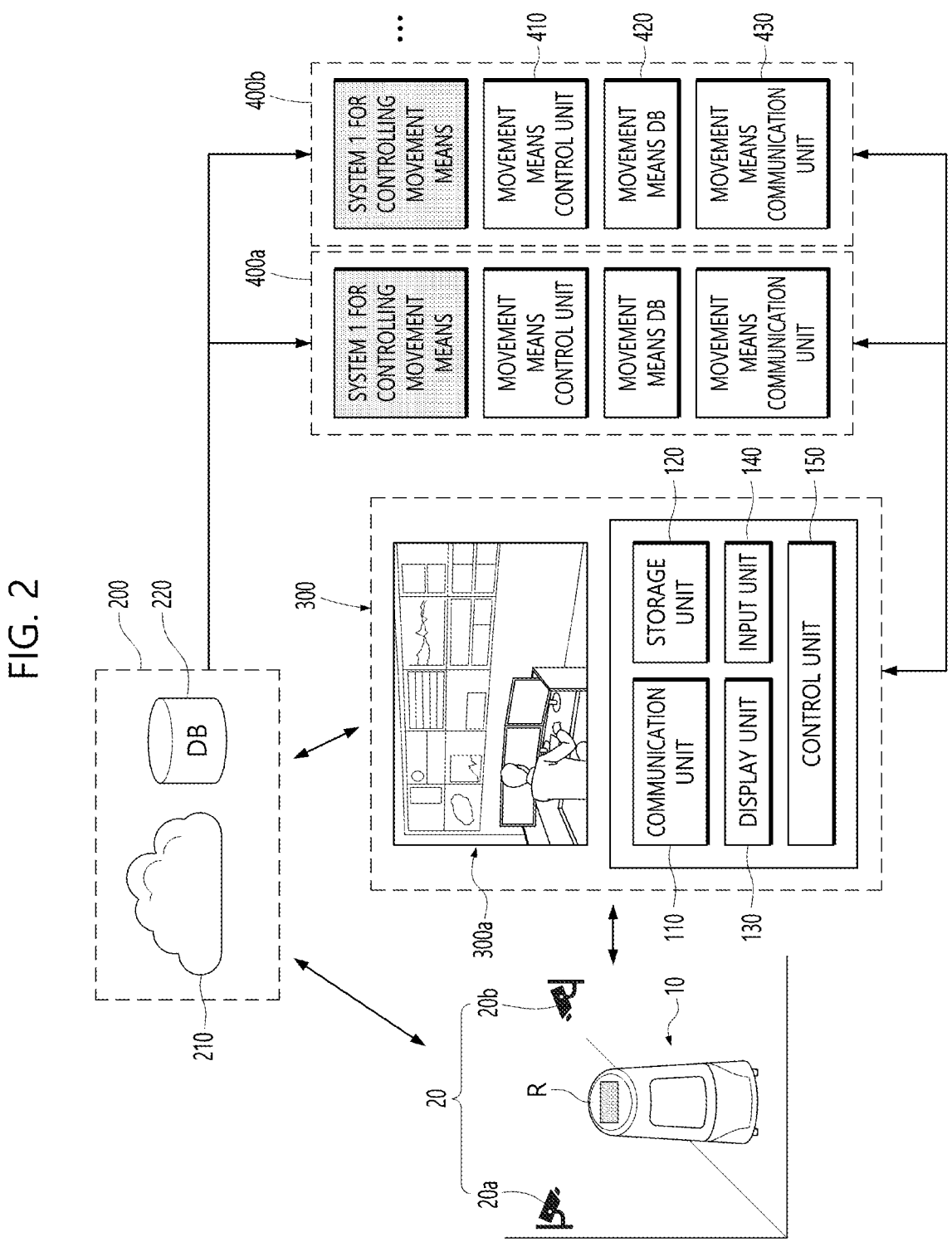

Hereinafter, exemplary embodiments disclosed in the present specification will be described in detail with reference to the accompanying drawings. The same or similar constituent elements are assigned with the same reference numerals regardless of reference numerals, and the repetitive description thereof will be omitted. The terms "module", "unit", "part", and "portion" used to describe constituent elements in the following description are used together or interchangeably in order to facilitate the description, but the terms themselves do not have distinguishable meanings or functions. In addition, in the description of the exemplary embodiment disclosed in the present specification, the specific descriptions of publicly known related technologies will be omitted when it is determined that the specific descriptions may obscure the subject matter of the exemplary embodiment disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present application, it should be understood that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Figure 3A:
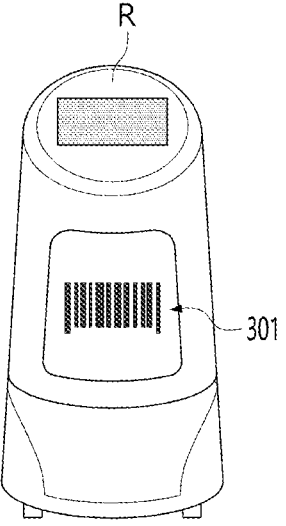
FIGS. 3A-3C are diagrams for illustrating a method of identifying robots in the method and the system for remotely controlling a robot according to the present disclosure.
Figure 3B:
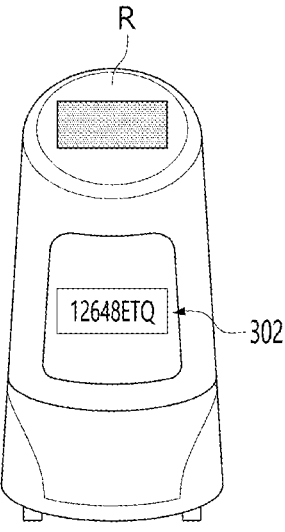
Figure 3C:
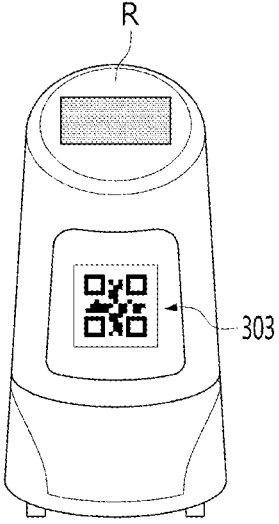
Figure 4A:
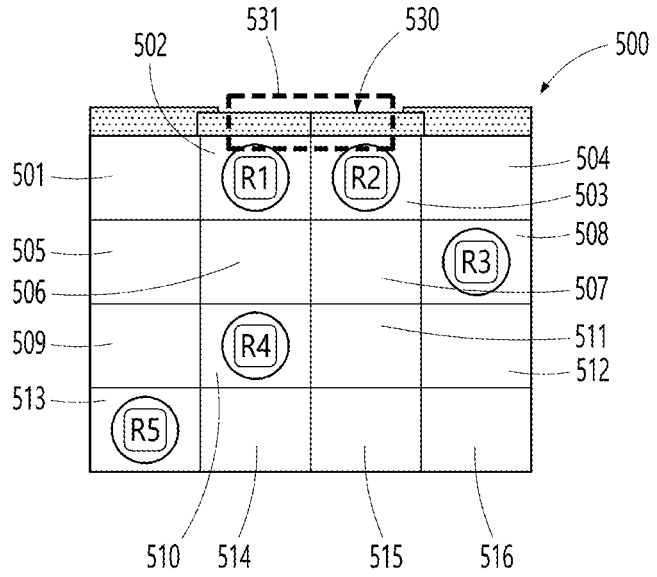
FIGS. 4A and 4B are diagrams for illustrating a movement means in the method and system for remotely controlling robots according to the present invention.
Figure 5:
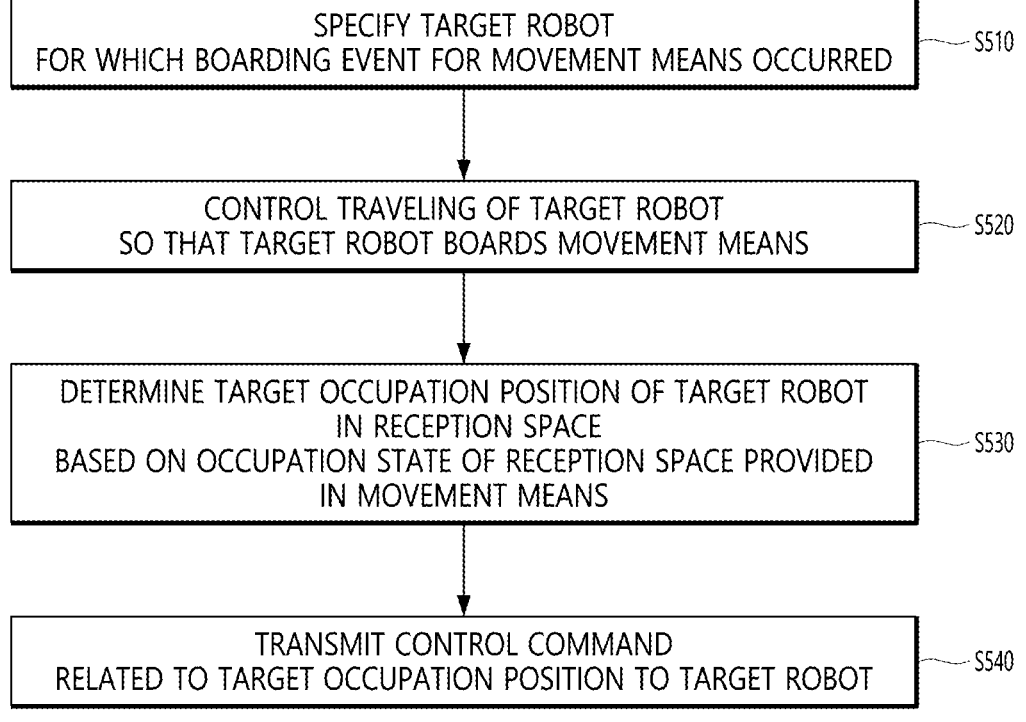
FIG. 5 is a flowchart for describing a method of remotely controlling robots according to the present invention.

The present invention provides a method and a system for remotely controlling robots traveling through space. Hereinafter, a system for remotely controlling robots will be described, along with the accompanying drawings. FIGS. 1 and 2 are diagrams for illustrating a method and a system for remotely controlling robots according to the present invention. FIGS. 3A-3C are diagrams for illustrating a method of identifying robots in the method and the system for remotely controlling a robot according to the present disclosure, and FIGS. 4A and 4C are diagrams for illustrating a movement means in the method and the system for remotely controlling robots according to the present invention. Further, FIG. 5 is a flowchart for describing a method of remotely controlling robots according to the present invention, and FIGS. 6A-6D, 7A-7B, 8A-8C, 9A-9B, 10A-10B, 11A-11B and 12A-12B are diagrams for illustrating a method of remotely controlling robots according to the present invention.

As illustrated in FIG. 1, robots are becoming increasingly used with the advancement of technology. While robots in the related art are used in specialized industries (e.g., in the field of industrial automation), robots are increasingly being transformed into service robots that are capable of performing useful tasks for humans or facilities.

As described above, robots capable of providing a variety of services may be configured to travel through a space 10 as illustrated in FIG. 1 in order to perform assigned tasks. There is no limitation on types of spaces that robots may travel through, and the robots may be configured to travel through at least one of indoor and outdoor spaces, as necessary. For example, the indoor space may be a variety of spaces, such as a department store, airport, hotel, school, building, subway station, train station, bookstore, etc. As described above, robots may be configured to provide useful services to humans by being disposed in a variety of spaces.

Meanwhile, there may be occasions when a robot traveling through these spaces needs to move between floors, or to remote locations, by getting on or off a movement means provided in the space as needed.

These means of movement may vary widely and include an elevator, an escalator, a motorized vehicle, a vehicle, a cart, and the like. For example, a robot is able to move from a specific floor where the robot is currently located to another floor by boarding an elevator.

When a robot moves using the movement means, it is necessary to comprehensively consider various situations such as the occupation position (a waiting position) of the robot within the movement means, the movement path, and the occupation state of other humans or robots within the movement means.

More specifically, when a robot moves through the movement means, there is a need to efficiently use the space of the movement means in terms of robots and humans, taking into account a wide variety of situations, such as i) a waiting position of the robot within the movement means, ii) a consideration of a space occupation relationship with other robots or humans present within the movement means, a movement path, etc, iii) a positional relationship with other robots or humans who desire to board the movement means, and iv) a positional relationship with other robots or humans who desire to get off the movement means.

Therefore, in order to move a robot using the movement means or to provide various services using the robot, it is an important factor to control the robot accurately. The control of robots may be performed using a combination of cameras disposed in the space surrounding the robot.

For example, as illustrated in FIG. 1, cameras 20 may be disposed in the space 10 where a robot R is positioned. As illustrated, the number of the cameras 20 disposed in the space 10 is not limited. It is of course possible that the space 10 may be inside the movement means.

As illustrated, a plurality of cameras 20a and 20b may be disposed in the space 10. Types of the cameras 20 disposed in the space 10 may vary, and in the present invention, a closed circuit television (CCTV) disposed in the space may be used.

While the example of FIG. 1 illustrates a method of sensing information in the space 10 using the cameras 20, the present invention does not place any particular limitations on the means of sensing the space 10. That is, in the present invention, through various sensors that are capable of sensing information in the space 10, information on the robot R traveling through the space 10 and various environments surrounding the robot may be sensed.

As illustrated in FIG. 2, according to the present invention, in a system 300 for remotely controlling robots, a robot R may be administered and controlled remotely.

The system 300 for remotely controlling robots according to the present invention may use at least one of images received from the cameras 20 (e.g., CCTV) disposed in the space 10, images received from the robots, information received from sensors provided on the robots, and information received from various sensors provided in the space to control traveling of the robots, or to perform appropriate controls on the robots.

Hereinafter, a system for remotely controlling robots according to the present invention will be described in more detail. As illustrated in FIG. 2, the system 300 for remotely controlling robots according to the present invention may include a communication unit 110, a storage unit 120, a display unit 130, an input unit 140, or a control unit 150.

The communication unit 110 may be configured to communicate with various devices disposed in the space 10, either wired or wirelessly. The communication unit 110 may communicate with the robot R, as illustrated. The communication unit 110 may be configured to receive various information (e.g., photographed images) sensed from sensors (e.g., cameras, lidar sensors, etc.) provided on the robot R through communication with the robot R.

Further, the communication unit 110 may be configured to communicate with at least one external server (or external storage, 200). Here, the external server 200 may be configured to include at least one of a cloud server 210, an edge cloud server, an edge computing server, or a database 220, as illustrated. The external server 200 may be configured to perform at least some of the roles of the control unit 150. That is, data processing, data calculation, or the like may be performed on the external server 200, and the present invention does not place any particular limitations on these methods.

The communication unit 110 may support various communication methods depending on the communication standards of devices to be communicated with. For example, the communication unit 110 may be configured to communicate with devices (including the cloud server) positioned inside or outside of the space 20 using at least one of wireless LAN (WLAN), wireless-fidelity (Wi-Fi), wireless-fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), fifth generation mobile telecommunication (5G), Bluetooth™, radio frequency identification (RFID), infrared communication (infrared data association (IrDA)), ultra-wideband (UWB), ZigBee, near field communication (NFC), Wi-Fi direct, or wireless universal serial bus (wireless USB) technologies.

Next, the storage unit 120 may be configured to store various information related to the present invention. In the present invention, the storage unit 120 may be provided in the system 300 for remotely controlling robots itself. Alternatively, at least a portion of the storage unit 120 may be stored on the external server 200 described above. That is, it can be understood that the storage unit 120 is sufficient to be a space in which information necessary for remotely controlling robots according to the present invention is stored, and there is no restriction on a physical space. Accordingly, hereinafter, the storage unit 120 and the external server will be referred to as the storage unit 120 without distinguishing separately. In this case, the cloud server 210 may mean "cloud storage". Further, the storage unit 120 may be configured to store various information related to systems 400a and 400b for controlling the movement means, as well as information related to the system 300 for remotely controlling robots.

First, in the storage unit 120, information on the robot R may be stored.

The information on the robot R may vary widely, and the information on the robot R may include, for example, i) identification information for identifying the robot R disposed in the space 10 (e.g., serial numbers, TAG information, QR code information, etc.), ii) mission information assigned to the robots R, iii) traveling path information set for the robot R, iv) position information on the robot R, v) state information on the robot R (e.g., power state, whether there is a failure, battery state, etc., vi) image information received from a camera provided on the robot R, and the like.

Next, in the storage unit 120, a map (or map information) of the space 10 may be stored. Here, the map may be configured as at least one of a two-dimensional or three-dimensional map. The map of the space 10 may mean a map that may be used to identify a current positions of the robot R, or to set a traveling path of the robot.

In particular, in the system 300 for remotely controlling robots according to the present invention, a position of the robot R may be identified based on an image received from the robot R or sensing information received from the robot R. To this end, the map of the space 10 stored in the storage unit 120 may be configured with data that allows a position to be estimated based on image or sensing information.

In this case, the map of the space 10 may be a map created based on a simultaneous localization and mapping (SLAM) by at least one robot moving through the space 10 in advance.

Meanwhile, in addition to the types of information listed above, a variety of information may be stored in the storage unit 120.

Next, in the storage unit 120, information on the cameras 20 may be stored.

The information on the cameras 20 may vary widely, and the information on the cameras 20 may include, i) identification information on each of cameras 20a, 20b . . . (e.g., serial number, TAG information, QR code information, etc.), ii) disposition position information on each of the cameras 20a, 20b . . . (e.g., information on which position each of the cameras 20a, 20b . . . is disposed in the space), iii) angle of view information on each of the cameras 20a, 20b . . . (e.g., information on which view of the space is being photographed by each of the cameras 20a, 20b . . . ), iv) state information on each of the cameras 20a, 20b . . . (e.g., power state, whether there is a failure, battery state, etc.), v) image information received from each of the cameras 20a, 20b . . . , and the like.

The information on the cameras 20 listed above may be present to be matched with each other with respect to each of the cameras 20a, 20b . . . .

For example, in the storage unit 120, at least one of identification information, position information, angle of view information, state information, and image information on a specific camera 20a may be matched and present as matching information. When a position where an image is desired later to be viewed is specified, this matching information may be usefully used to specify a camera at the corresponding position.

Further, the storage unit 120 may store information on various sensors disposed within the space 10. For example, in the storage unit 120, at least one of identification information, position information, sensing range information, or sensing information of a specific sensor may be mutually matched to respective sensors and present as matching information. The storage unit 120 may be a non-transitory computer-readable recording medium such as magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories).

Next, the display unit 130 may be configured to output an image received from at least one of the cameras provided on the robot R or the cameras 20 disposed in the space 10. The display unit 130 is provided on a device of an administrator who remotely administer the robot R, and may be provided in a remote control room 300a, as illustrated in FIG. 2. Further, in contrast, the display unit 130 may be a display provided on a mobile device. As described above, the present invention does not limit a type of the display unit.

Next, the input unit 140 is for inputting information from a user (or an administrator), and the input unit 140 may be a medium between a user (or an administrator) and the system 300 for remotely controlling robots. More specifically, the input unit 140 may mean an input means for receiving a control command for controlling the robot R from a user. The input unit 140 may include, but is not limited to, a key pad, a dome switch, a touchpad (a contact capacitance type, a pressure resistance type, an infrared sensing type, a surface ultrasonic wave conduction type, an integral tension measurement type, a piezoelectric effect type, etc.), a jog wheel, a jog switch, etc. In this case, there is no particular limitation on a type of input unit 140, and the input unit 140 may include at least one of a mechanical input means (or a mechanical key, e.g., a mouse, a joystick, a physical button, a dome switch, a jog wheel, a jog switch, etc.) and a touch input means. As an example, the touch input means may include virtual keys, soft keys, or visual keys that are displayed on a touchscreen through software processing, or touch keys that are disposed on a portion other than the touchscreen. Virtual or visual keys may be displayed on the touchscreen in a variety of forms, and may be configured to be, for example, a graphic, a text, an icon, a video, or a combination thereof. In this case, when the input unit 140 includes the touchscreen, the display unit 130 may be configured as the touchscreen. In this case, the display unit 130 may perform both a role of outputting information and a role of receiving information.

Next, the control unit 150 may be configured to control an overall operation of the system 300 for remotely controlling robots related to the present invention. The control unit 150 may process signals, data, information, and the like that are input or output through the constituent elements described above, or may provide or process appropriate information or functions to a user. The control unit 150 may include any type of device capable of processing data, such as a processor. Here, a processor may refer to a hardware-implemented data processing device having a circuit physically structured to perform functions expressed in a code or instructions included in a program. For example, the hardware-implemented data processing device may include a microprocessor, a central processing unit (CPU), a processor core, a multiprocessor, an application-specific integrated circuit (ASIC), a field programmable gate array (FPGA), etc., but the scope of the present invention is not limited thereto.

The control unit 150 may be configured to include a process based on artificial intelligence or deep learning algorithms.

In the present invention, the control unit 150 may perform various controls for boarding, waiting, and deboarding of the robot on the movement means.

A variety of movement means may be included in the space 10, and these movement means may be controlled by the systems 400a and 400b for controlling the movement means in a centralized manner.

Furthermore, in the case of a movement means being an elevator, a facility is required, in which case the system for controlling the movement means may also be referred to as a "facility control system".

The systems 400a and 400b for controlling the movement means may be configured for each movement means for movement of the robot in the space, but is not limited thereto. Each of the systems 400a and 400b for controlling the movement means may include a movement means control unit 410, a movement means database (DB) 420, and a movement means communication unit 430.

The movement means control unit 410 is configured to perform control related to the operation of the movement means and to monitor the state of the movement means. The movement means control unit 410 may generate movement means information by using a configuration included in the system 400a or 400b for controlling the movement means, or by monitoring the state of the movement means through communication with the robot R and the system 300 for remotely controlling robots.

For example, the movement means control unit 410 may calculate the occupation state of the movement means, the current congestion level, and the like by monitoring whether a robot or a human is on board within a reception space of the movement means.

In another example, when there is included a case where a specific movement means is configured in plural (e.g., a plurality of elevators), the movement means control unit 410 may monitor which movement means is currently available.

In one embodiment, the movement means control unit 450 may process signals, data, information, and the like that are input or output through the constituent elements described above, or may provide or process appropriate information or functions to a user. The movement means control unit 450 may include any type of device capable of processing data, such as a processor. Here, a processor may refer to a hardware-implemented data processing device having a circuit physically structured to perform functions expressed in a code or instructions included in a program. For example, the hardware-implemented data processing device may include a microprocessor, a central processing unit (CPU), a processor core, a multiprocessor, an application-specific integrated circuit (ASIC), a field programmable gate array (FPGA), etc., but the scope of the present invention is not limited thereto.

The movement means communication unit 430 transmits and receives data to and from the robot R or the system 300 for remotely controlling robots.

Information related to the movement means may be stored in the movement means DB 420. In particular, at least one of a type of movement means, information related to a server corresponding to the movement means, or position information corresponding to a position where the movement means is disposed (e.g., node information on a node corresponding to the movement means, when a node map of the space 10 exists) may be stored in the movement means DB 420. However, the types of data stored in the movement means DB 420 are not limited thereto.

The systems 400a and 400b for controlling the movement means described above may be referred to as a server corresponding to the movement means.

According to the above description, in the present invention, the systems 400a and 400b for controlling the movement means and the system 300 for remotely controlling robots have been described as separate configurations. However, the present invention is not limited thereto, and the systems 400a and 400b for controlling the movement means and the system 300 for remotely controlling robots may be configured as one integrated system.

In the present invention, the control unit 150 may control the movement path or the traveling path of the robot R within the space 10. That is, the control unit 150 may generate a control command related to the traveling of the robot R, and transmit the control command to the robot R.

The robot R may be configured to move through the space 10, under the control of the control unit 150. Further, the robot R may be configured to board and deboard the movement means, and to wait or move within the movement means, under the control of the control unit 150.

To this end, it is necessary for the control unit 150 to continuously monitor the state of the robot R in the space 10 and the movement means 500. There are various methods of monitoring the robot R, and in order to monitor the robot R, the identification of the robot R that is targeted for monitoring needs be prioritized. The control unit 150 may safely and efficiently operate the space 10 by accurately identifying the robot R targeted to be controlled and transmitting an accurate control command to the robot R targeted to be controlled.

To this end, each robot R may be assigned with identification information, and each identification information may be extracted from the robot R in various methods.

The control unit 150 may extract the identification information of the robot R traveling through the space 10, and generate a control command for the robot R corresponding to the extracted identification information.

The methods of recognizing and extracting the identification information on the robot R may vary widely, and some examples of the various methods will be described.

First, as illustrated in FIGS. 3A-3C, the identification information on the robot R may be extracted from an image based on an identification label (or an identification mark) provided on the robot R. As illustrated in FIGS. 3A to 3C, the identification labels 301, 302, and 303 of the robot R may include the identification information on the robots. As illustrated, the identification labels 301, 302, and 303 may be configured as a barcode 301, serialization information (or serial information) 302, and a QR code 303, in which the barcode 301, serialization information (or serial information) 302, and QR code 303 are each configured to include the identification information on the robot.

The identification information on the robot R is information that distinguishes one robot from another, and robots of the same type may have different identification information. The information composing the identification label may be configured in a variety of ways, in addition to the barcode, serialization information, and QR code described above.

The control unit 150 may specify the robot R photographed by the cameras 20 and identify a position of the specified robot R in the space 10 by extracting the identification information on the robot R based on the identification label described above from an image received from the cameras 20.

In the present invention, a method of identifying the robot R photographed by the cameras 20 may vary. As described above, the control unit 150 may specify the robot R by extracting the identification information on the robot R from the image. Additionally, the control unit 150 may specify the current position of the robot R photographed by the cameras 20 using at least one of the time when the image was photographed and the position information matched to the cameras 20 that photographed the image.

Further, the control unit 150 may recognize the robot R traveling through the space 10 and extract the identification information on the robot R in various methods, in addition to the methods described above.

Figure 4B:
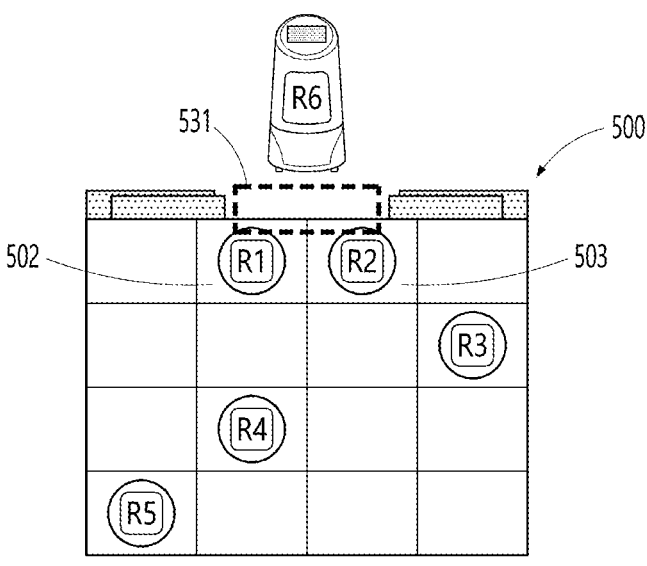

As illustrated in FIG. 4A and FIG. 4B, at least one robot R1 to R6, may board (or ride on), wait for, or deboard a movement means 500 as necessary.

In this case, the movement means 500 may be provided with a reception space 510 configured to receive a robot or a human. The reception space 510 may also be referred to as the "interior (or inner space) of the movement means 500" or the like. Accordingly, in the present invention, the term reception space 510 will be used interchangeably with the inner space or interior of the movement means 500, in which case the reference numeral 510 will be assigned to all.

Further, the movement means 500 may be provided with an entrance and exit door 530 and an entrance and exit region 531. A human or a robot may enter the interior of the movement means 500 or exit the movement means 500 through the entrance and exit region 531.

The reception space 510 of the movement means 500 may include a plurality of regions 501 to 516 divided on the basis of a predetermined reference. This is to efficiently manage an occupation position (or a waiting position) and a movement path of the robot within the reception space 510.

In this case, the reception space 510 may be configured with a plurality of regions 501 to 516 divided in the form of a grid. The control unit 150 may control the robot such that the robot is positioned in at least some of the plurality of regions. Further, the control unit 150 may control a movement path of the robot to move between the plurality of regions.

Each of the plurality of regions 501 to 516 may be configured to have an area such that a single robot may be included. The control unit 150 may control an occupation state of the reception space 510 of the movement means by positioning robots in any one of the plurality of regions 501 to 516, respectively.

In the present invention, the term "occupation state" may mean a state of i) how much of the reception space 510 is occupied by robots or humans (or animals), ii) which regions of the reception space 510 are occupied by robots or humans, iii) which regions of the reception space 510 are unoccupied. The occupation state may be defined by information sensed by sensors (e.g., cameras, etc.) provided within the robot or the movement means.

The control unit 150 may flexibly cope with changes in the reception space 510 by monitoring and updating the occupation state of the reception space 510 in real time or at a predetermined interval.

As illustrated in FIG. 4A, the control unit 150 may, based on the occupation state, specify a waiting position of the robot within the reception space 510 and control each robot to be positioned in the specified region.

In this case, the waiting position of the robot may also be referred to as an "occupation position of the robot." The waiting position or occupation position may be understood as a position where the robot stops and waits within the movement means 500 while the robot is moving with the movement means 500.

The control unit 150 may control which region within the movement means 500 each robot waits in. For example, as illustrated in FIG. 4A, the control unit 150 may dispose a first robot R1 and a second robot R2 close to the entrance and exit region 531, and dispose a fifth robot R5 in a region farthest from the entrance and exit region 531.

In this case, which region to position which robot in, or whether to move which robot, may be determined based on at least one of the mission assigned to each robot, the destination of the robot, the battery state (energy state) of the robot, or the occupation state of the reception space 510.

The control unit 150 may perform control of each of the robots boarding, deboarding, or waiting in the reception space 510 based on at least one of the various factors described above.

Further, as illustrated in FIG. 4B, the control unit 150 may control at least one of the other robots (or neighboring robots) that are on board the movement means 500 before or with a target robot (e.g., a sixth robot R6) that desires to board or deboard the movement means 500.

For example, as illustrated, in order for the target robot (e.g., the sixth robot R6) to enter the reception space 510 through the entrance and exit region 531, there may be a case in which at least one of the first robot R1 or the second robot R2 needs to move to a different region. As described above, the control unit 150 may perform control of not only the target robot, but also at least one of the other robots (or neighboring robots) in order for a plurality of subjects (at least one robot, at least one human, etc.) to use the movement means 500 smoothly.

In the present invention, as illustrated in FIG. 4, the example of controlling the waiting position of the robot by dividing the interior of the movement means 500 into a plurality of regions 501 to 516 in the form of a grid has been described. However, the present invention does not place any particular limitations on the manner in which the interior of the movement means 500 is divided. That is, the reception space 510 of the movement means 500 may be defined as a plurality of regions in a variety of ways. For example, the reception space 510 may be represented by a node map that includes a plurality of nodes. In this case, the robot may move through the reception space 510 by moving from one node to another among the plurality of nodes. Further, in this case, the robot may wait at any one node of the plurality of nodes while the movement means is moving.

Hereinafter, for convenience of description, a method of dividing the reception space 510 in the aforementioned grid manner will be described as an example, but the present invention is not limited thereto.

In the following, a method of remotely controlling a robot that boards the movement means will be described in more detail with reference to FIG. 5.

First, in the method of remotely controlling a robot according to the present invention, a process of specifying a target robot in which a boarding event for the movement means has occurred may be performed (S510).

Here, the boarding event is a case in which a situation occurs that the robot needs to board the movement means, and recognizing the occurrence of the boarding event may be achieved through a variety of ways. In an example, the control unit 150 may monitor the position of the robot traveling through the space in real time or at a preset time interval. Further, the control unit 150 may determine, as a result of the monitoring, whether the robot needs to board the movement means. As a result of the determination, when the robot needs to board the movement means in order to move to a destination, the control unit 150 may determine that a boarding event has occurred for the robot. In this case, the recognition of the boarding event may be performed by the control unit 150.

In contrast, the control unit 150 may receive information on the boarding event from the robot. The information on the boarding event may include information that notifies that the boarding event has occurred on the robot. The robot may travel through the space along a pre-planned movement path and, when the use of the movement means is included in the movement path, the robot may proceed to board the movement means based on the pre-planned movement path.

The robot may transmit the current position of the robot, environment information surrounding the robot, and situation information to the control unit 150 in real time or at a preset time interval. In this case, when the robot determines that it is necessary to use the movement means in the current situation, the robot may generate a boarding event for the movement means and transmit information thereon to the control unit 150.

Further, the information on the boarding event may be received from the movement means or the system for controlling the movement means. The movement means or the system for controlling the movement means may sense a robot that approaches or is positioned around the movement means, or may sense a robot that transmits a request to use the movement means. In this case, the movement means or the system for controlling the movement means may determine that a boarding event has occurred for the corresponding robot, and may transmit information on the boarding event, together with identification information on the robot, to the control unit 150.

As described above, when the boarding event occurs through various paths, the control unit 150 may specify a target robot for which the boarding event has occurred.

The target robot may mean, among various robots traveling in a space, a robot that is targeted to be controlled for boarding the movement means.

As described above, when the target robot is specified, in the present invention, a process of controlling the traveling of the target robot may proceed such that the target robot boards the movement means (S520).

The control unit 150 may transmit a control command to the target robot that enables the target robot to board the movement means. The target robot may, based on the control command, board the movement means.

In the present invention, based on the occupation state of the reception space provided in the movement means, a process of determining a target occupation position of the target robot in the reception space may proceed (S530).

Here, as illustrated in FIGS. 6A to 6D, the target occupation position may be a position with respect to a region occupied by the target robot R1 or R2 in the reception space of the movement means 500.

Further, the target occupation position may be understood as a waiting position in which the target robot on board the movement means 500 waits in the movement means 500 while the target robot is moving with the movement means 500.

In the present invention, the term, target occupation position, may be used interchangeably with terms having similar meanings, such as "waiting position", "occupation position", and the like.

Further, a "position" in an occupation position, a waiting position, or the like may also be understood as at least some region of the reception space, and the at least some region may be a region occupied by the target robot.

In the present invention, the target occupation position of the target robot may be determined based on various references.

The control unit 150 may determine the target occupation position of the target robot based on at least one of various references, such as i) the occupation state of the reception space, ii) destination information on other robots or humans who have boarded the movement means, iii) the time by which a mission assigned to the target robot needs to be completed, iv) the energy state of the target robot (e.g., battery charging state), v) a space operation reference that is predetermined in relation to the reception space, and the like.

In an example, the control unit 150 may determine the occupation position of the target robot based on the occupation state of the reception space of the movement means 500 and the space operation reference predetermined in relation to the reception space.

In the reception space, an occupiable space that is able to be occupied by the robot may be preset. The control unit 150 may set the occupation position of the target robot such that the target robot may be positioned in the occupiable space.

Figure 6A:
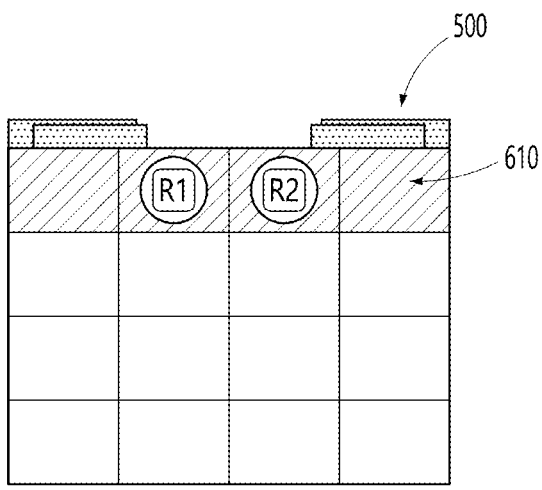
FIGS. 6A-6D, 7A-7B, 8A-8C, 9A-9B, 10A-10B, 11A-11B and 12A-12B are diagrams for illustrating a method of remotely controlling robots according to the present invention.

The occupiable space may be set in a variety of ways, for example, as illustrated in FIG. 6A, a region 610 adjacent to the entrance and exit region (or entrance and exit) of the movement means 500 may be specified as the occupiable space. In this case, the control unit 150 may set at least one region of the occupiable space 610 as a target occupation position such that the target robot may be disposed in the occupiable space 610.

The storage unit 120 may include a map of the reception space of the movement means 500, and the corresponding map may include information on the occupiable space.

With reference to the map, the control unit 150 may extract the occupiable space of the movement means, and set at least one region of the extracted occupiable space 610 as the target occupation position.

Figure 6B:
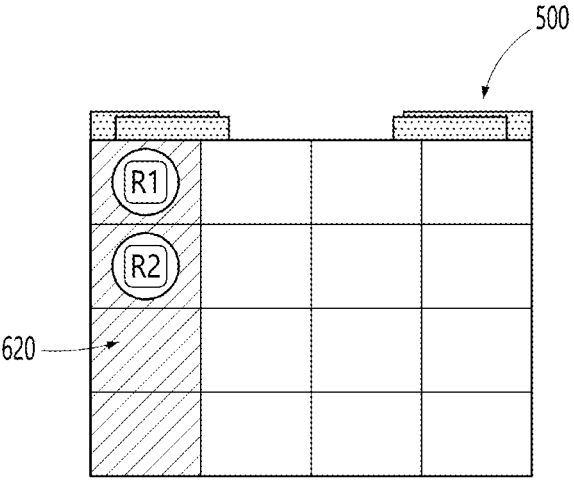
Figure 6C:
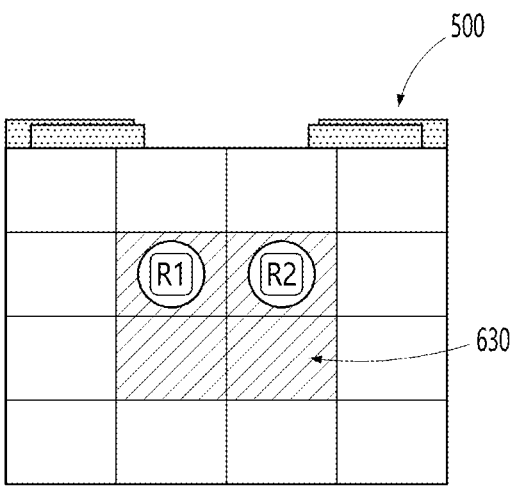

The occupiable space may be set along an edge region 620 of the reception space of the movement means 500, as illustrated in FIG. 6B, and may be set in a center region 630 of the reception space, as illustrated in FIG. 6C.

Figure 6D:
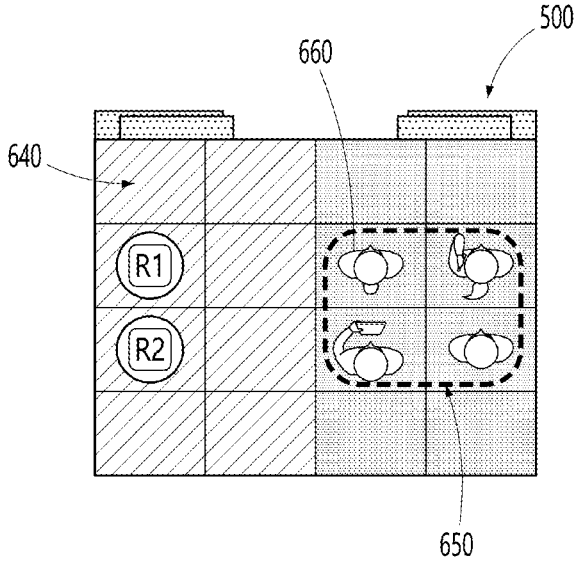

Further, as illustrated in FIG. 6D, the movement means 500 may be a means in which humans 660 may board as well as robots. In this case, the reception space of the movement means 500 may be divided into a first region 640 that may be occupied by robots and a second region 650 that may be occupied by humans for safety of the robots and humans.

The control unit 150 may set the occupation position of a robot such that the robot is positioned on the first region 640 of the reception space when the robot boards the movement means 500.

The control unit 150 may output a guidance announcement when the human boards the movement means 500 such that the human is positioned in the second region 650. Further, information on the region in which the robot or human needs to be positioned may be visibly indicated on the floor of the movement means 500, etc. To this end, the human 660 (a user) may recognize which region the human needs to be positioned in the movement means 500.

Also, the control unit 150 may identify and determine which region of the occupiable space to position the target robot in, even when at least some of the reception space of the movement means 500 is set as the occupiable space for robots.

This is because there may already be other robots or humans in the occupiable space. To this end, the control unit 150 may identify whether an object occupying the reception space is present, using sensing information sensed by at least one sensor provided on the movement means or on the robot. Here, the object may be a human or a robot. Further, the control unit 150 may specify the occupation state of the reception space based on whether there is an object occupying the reception space.

In the present invention, the term "occupation state" may mean a state of i) how much of the reception space is occupied by robots or humans (or animals), ii) which regions of the reception space are occupied by robots or humans, iii) which regions of the reception space are unoccupied, or the like. The occupation state may be defined by information sensed by sensors (e.g., cameras, etc.) provided within the robot or the movement means.

In the present invention, the control unit 150 may flexibly cope with changes in the reception space by monitoring and updating the occupation state of the reception space in real time or at a predetermined interval.

The control unit 150 may, based on this occupancy state, specify the occupation position in which the target robot is to be positioned among the occupiable regions of the reception space. The occupation position that may be occupied by the target robot may be an empty region that is not occupied by an object and is on a movement path that allows the target robot to move through the entrance and exit region of the movement means.

The control unit 150 may determine at least some of remaining regions of the reception space excluding a region occupied by the object as the target occupation position of the target robot, such that the target robot is not positioned to overlap the region occupied by the object on board the movement means 500 in the reception space.

Further, the control unit 150 may set the target occupation position of the target robot within the movement means, even if the occupiable region is not preset.

Figure 7A:
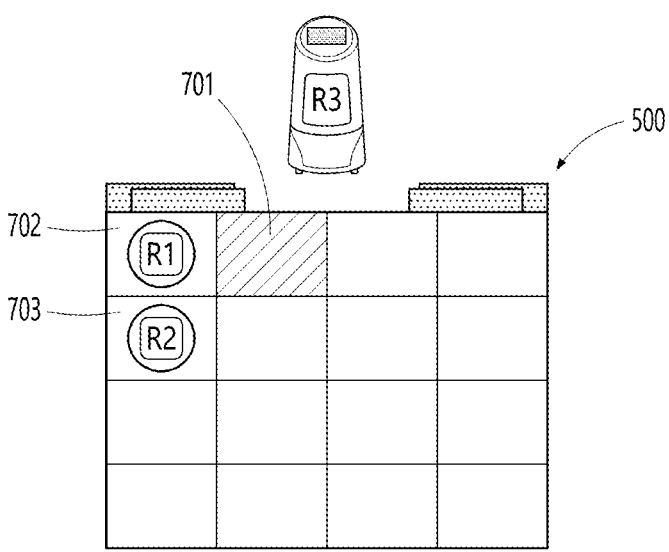
Figure 7B:
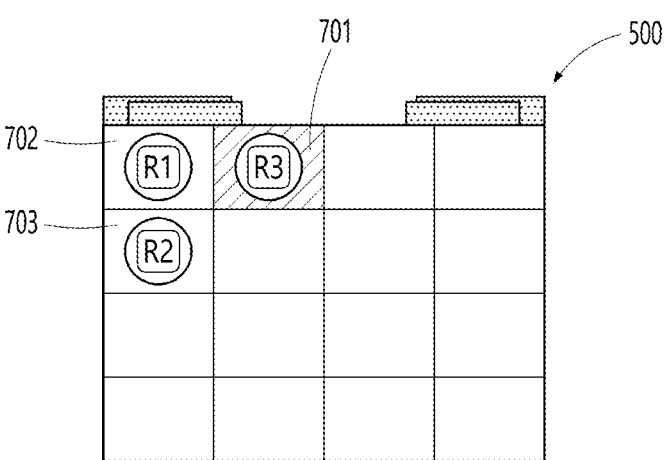

In an example, the control unit 150 may set at least some of the occupiable regions (or an empty region) that may be occupied by the target robot as the target occupation position based on the occupation state of the movement means. In this case, as illustrated in FIG. 7A, the control unit 150 may set a specific region 701 that is closest to the entrance and exit region as the target occupation position. Further, as illustrated in FIG. 7B, the control unit 150 may control a target robot R3 such that the target robot R3 is positioned at a target occupation position 701. That is, the control unit 150 may set a position that is closest to the entrance and exit region (or entrance and exit) of the movement means among the regions that may be occupied by the target robot as the target occupation position. In this case, the time for the target robot to board and deboard the movement means may be minimized. This means that the target occupation position is determined in consideration of the time efficiency of the target robot, in which case the target robot may save the time consumed in using the movement means.

As another example, the control unit 150 may, based on the occupation state of the movement means, set a position where a movement distance is minimized within the movement means among the occupiable regions (or empty regions) that may be occupied by the target robot as the target occupation position. In this case, the control unit 150 may refer to destination information on other objects (robots or humans (users)) that are on board or scheduled to be on board the movement means.

The control unit 150 may compare the destination of the target robot to the destinations of the other objects to determine whether there is an object that deboards before the destination of the target robot. Further, the control unit 150 may set a position in which the movement of the target robot is minimized as the target occupation position for deboarding of the object such that the occupation position of the target robot is not included in the deboarding movement path of the object that deboards the movement means before the target robot.

This is to minimize the movement distance of the target robot within the movement means, and may be a method of setting the target occupation position in consideration of the energy efficiency of the target robot.

For example, when the movement means is an elevator, the control unit 150 may determine whether there is a stopping floor for the elevator between the destination floors corresponding to the destination of the target robot. Further, the control unit 150 may identify an object scheduled to deboard at the corresponding stopping floor. The control unit 150 may, based on the occupation position of the object scheduled to deboard, set a region that is least likely to overlap the deboarding movement path of the object scheduled to deboard as the target occupation position of the target robot.

As described above, it has been seen that the control unit 150 may set the target occupation position of the target robot within the movement means in consideration of either the time efficiency or the energy efficiency of the target robot.

The control unit 150 may determine, based on an operation mode of the target robot, whether to prioritize time efficiency or energy efficiency to determine the occupation position of the target robot.

The target robot may be operated in any one of a plurality of different operation modes, based on the importance, urgency, and energy state (power or battery charging state) of the mission assigned to the target robot.

Further, depending on which operation mode the target robot is operated in, the target occupation position in the reception space may vary.

A first operation mode of the plurality of operation modes may be an operation mode that prioritizes the time efficiency of the target robot, and a second operation mode of the plurality of operation modes may be an operation mode that prioritizes the energy efficiency of the target robot.

When the target robot is operated in the first operation mode, the control unit 150 may determine a region that is closest to the entrance and exit of the movement means among occupiable regions of the reception space as the target occupation position. In this case, the target robot may repeatedly move from and return to the target occupation position, within the movement means, depending on the boarding or deboarding of other objects.

Further, when the target robot is operated in the second operation mode, the control unit 150 may determine a region in which the movement distance of target robot is minimized as the target occupation position in consideration of destinations of objects positioned in the reception space.

As described above, the control unit 150 may identify the operation mode of the target robot and set the occupation position of the target robot based on the operation mode of the target robot.

Meanwhile, the control unit 150 may perform control of objects (or other robots R1 and R2) on board the movement means 500 in order to position the target robot R3 in the target occupation position. In this case, at least one of other robots R1 and R2 may change its occupation position within the movement means 500 in order to position the target robot R3 in the target occupation position.

Figure 8A:
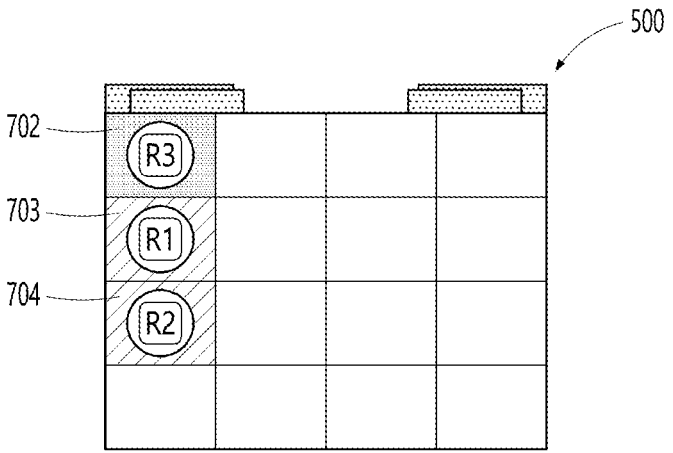

In an example, the control unit 150 may attempt to set the target occupation position of the target robot R3 at one edge region 702 closest to the entrance and exit. However, as illustrated in FIG. 7A, the other object R1 may already be positioned in the corresponding region. In this case, the control unit 150 may perform control to move the at least one of the other robots R1 and R2 to a different region 703 or 704 in order to position the target robot R3 at the target occupation position 702, as illustrated in FIG. 8A. In this case, the at least one of the other robots R1 and R2 may be moved to the different region 703 or 704 based on a control command of the control unit 150.

As described above, when setting the target occupation position of the target robot, the control unit 150 does not only consider the operation mode of the target robot or the occupation state of the movement means, but also considers the occupation states of other objects on board the movement means, determines whether to change the occupation states of the other objects, and performs appropriate control thereof.

In this case, the control unit 150 may determine whether to change the position of the target robot to the corresponding target occupation position 702 while changing the occupation positions of the other robots, considering various conditions such as the energy states, missions, operation modes, and destinations of the other robots. That is, the control unit 150 may determine the priority for a target to occupy the target occupation position 702. Then, a high-priority target (the target robot or other objects) can be positioned in the target occupation position. For example, when the target robot R3 has a low priority, the target robot may not be assigned a region closest to the entrance and exit as the target occupation position.

As an example, a method of setting the target occupation position of the target robot R3 based on the destinations of the target robot R3 and other objects (other robots) will be described.

The control unit 150 may set a target occupation position based on destination information on an object (such as a robot or a human) that has boarded or is scheduled to board the movement means.

In this case, the control unit 150 may control not only the target robot but also objects (other robots) on board the movement means in consideration of the destination information of the objects, in addition to the method of setting the target occupation position described above.

For example, as illustrated in FIG. 7A, the control unit 150 may determine the destinations of other objects R1 and R2 that have boarded the movement means 500 first when determining the target occupation position of the target robot R3. Further, the control unit 150 may determine the target occupation position of the target robot based on the destinations of the objects, and may control the target robot and the other robots together to position the target robot R3 at the determined target occupation position.

The control unit 150 may specify a deboarding order of the target robot R3 and the other robots R1 and R2 with respect to the movement means 500 based on the destinations of the target robot R3 and the other robots R1 and R2. Further, the control unit 150 may determine whether to position the target robot R3 closer to the entrance and exit of the movement means 500 than the other robots R1 and R2, based on the above deboarding order.

The control unit 150 may position the target robot R3 and the other robots R1 and R2 closer to the entrance and exit, depending on the deboarding order. For example, as illustrated in FIG. 8A, when the deboarding order of the target robot R3 is the earliest among the target robot R3 and the other robots R1 and R2, the target occupation position of the target robot R3 may be set to the specific region 702 closest to the entrance and exit. In this case, the occupation positions (waiting positions) of the other robots R1 and R2 may change compared to FIG. 7A. The control unit 150 may control the movement of the other robots R1 and R2 to position the target robot R3 to the target occupation position 702.

Figure 8B:
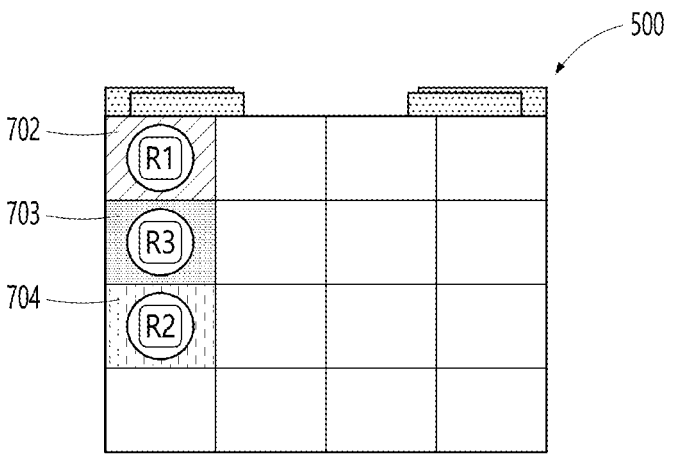

In another example, as illustrated in FIG. 8B, when the deboarding order of the target robot R3 is later than the first robot R1 and earlier than the second robot R2 among the other robots R1 and R2, the target occupation position of the target robot R3 may be determined as the region 703 between the first robot R1 and the second robot R2.

Figure 8C:
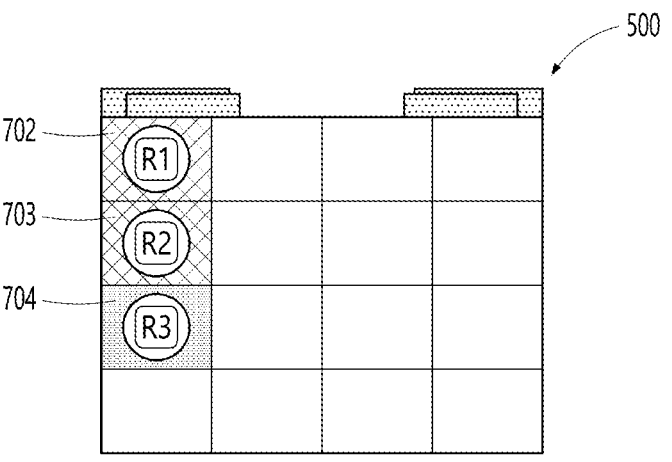

Further, as illustrated in FIG. 8C, when the deboarding order of the target robot R3 is the latest compared to the other robots R1 and R2, the target occupation position of the target robot R3 may be determined as a region 704 after the first robot R1 and the second robot R2.

In one embodiment, the control unit 150 may determine the target occupation position of the target robot R3 in consideration of state information on the other robots, even if the target robot R3 needs to be positioned closest to the entrance and exit in the deboarding order of the target robot R3 and the other robots R1 and R2. For example, when the other robots have low battery capacity (e.g., equal to or less than a preset reference value, or not enough to perform the assigned mission), the movement of the other robots may be restricted. In this case, the target robot R3 may be positioned far away from the entrance and exit, even if the deboarding order of the target robot R3 is earlier than the other robots. As described above, the control unit 150 may monitor state information on robots traveling in a space in real time or at a preset time interval to perform appropriate control over the states of the robots.

Meanwhile, humans may board the movement means 500 as well as robots. In this case, since the control unit 150 recognizes the sizes of the robots and the movement paths of the robots, the control unit 150 may predict possible collisions between the robots. However, in case of humans, it is difficult for the control unit 150 to perfectly predict the movement directions and sizes of humans. Therefore, the control unit 150 may set the occupation position of the target robot in consideration of the characteristics of the object in order to reduce the complexity of the movement means 500 by preventing possible collisions between the human and the robot, and by avoiding overlapping movement paths between the human and the robot.

Figure 9A:
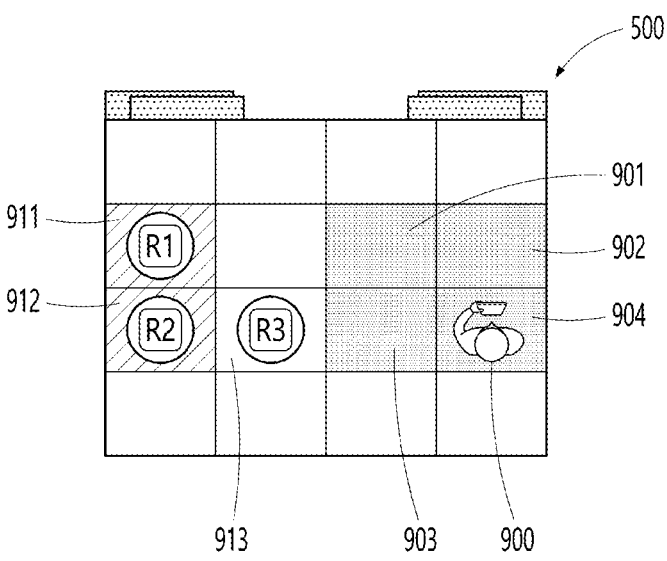

In the present invention, the size of an occupied region of an object may be specified differently based on the object type of the object. In the present invention, an object may mean a human or a robot. The object type may include a first type and a second type, depending on a type of the object. As illustrated in FIG. 9A, an object according to the first type may correspond to a robot R1, R2, or R3 that is remotely controllable by the control unit 150. Further, as illustrated in FIG. 9B, an object according to the second type may correspond to a specific object 900 (e.g., a human) that is not remotely controllable.

Figure 9B:
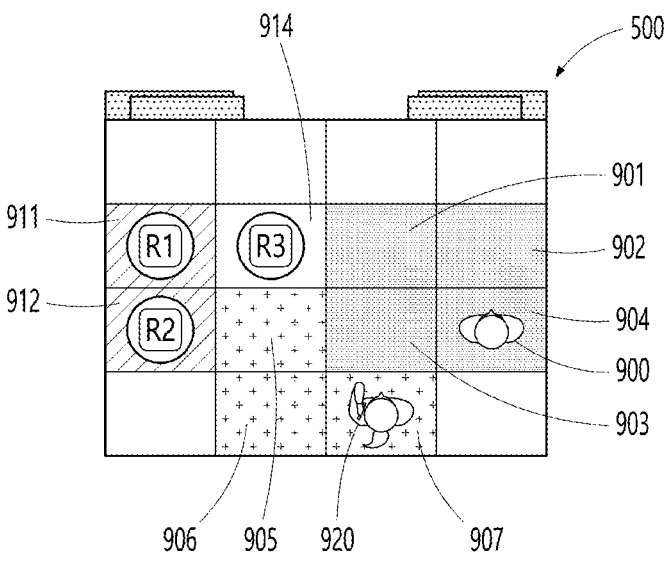

The control unit 150 may assign a region 911, 912, or 913 corresponding to one compartment of the plurality of occupiable regions of the reception space as an occupation region for each robot, as illustrated in FIG. 9A and FIG. 9B with respect to a robot that is the first type of object.

In contrast, the control unit 150 may assign a region 901, 902, 903, 904, 905, 906, or 907 corresponding to a plurality of compartments among the plurality of occupiable regions of the reception space as an occupation region for each of the second type of objects 900 and 920, as illustrated in FIG. 9A and FIG. 9B.

As described above, the size of the occupied region of the object according to the second type that may not be possible to be controlled by the control unit 150 may be larger than the size of the occupied region of the object according to the first type.

Meanwhile, the control unit 150 may set the target occupation position of the target robot R3 such that the target robot R3 is not positioned within the occupation region 901, 902, 903, 904, 905, 906, or 907 of the second type of object, as illustrated in FIG. 9A and FIG. 9B.

The control unit 150 may set the target occupation position of the target robot R3 based on the occupation states of the objects in the movement means 500 using a sensor provided in the movement means 500 or the robot.

As described above, in the present invention, the occupation position of the target robot may be determined in consideration of various situations surrounding the robots and objects on board the movement means. Further, in the present invention, when the target occupation position is determined, a process of transmitting a control command related to the target occupation position to the target robot may proceed (S540).

The target robot may perform a movement within the movement means 500 to be positioned at the target occupation position based on the control command related to the target occupation position being received.

Meanwhile, deboarding events for other objects on board the movement means may occur in a state where the target robot is on board the movement means.

The control unit 150 may receive a deboarding event for a specific object positioned in the reception space in a state where the target robot is positioned in the target occupation position of the reception space in the movement means 500. Further, the control unit 150 may, in response to the deboarding event, determine whether the target robot is positioned on a deboarding path of the specific object.

Further, the control unit 150 may reset the occupation position of the target robot for the deboarding of the specific object from the movement means, when the target robot is positioned on the deboarding path of the specific object.

In this case, the control unit may determine whether to reset the occupation position of the target robot for the deboarding of the specific object for which the deboarding target event occurred.

The control unit 150 may determine whether to reset the occupation position of the target robot based on, i) the battery level of the target robot, ii) the battery level of the specific object for which the deboarding target event occurred, iii) the shortest distance movement path of the specific object for which the deboarding target event occurred, iv) whether the occupation position of the target robot is on an essential movement path for deboarding of the specific object for which the deboarding target event occurred, and the like.

The occupation position of the target robot that is reset may be set in a wide variety of ways. In an example, the control unit 150 may set the occupation position of the target robot to a position closest to the entrance and exit of the movement means among remaining regions excluding the deboarding path of the specific object for which the deboarding target event has occurred.

Further, the control unit 150 may perform a comparison of the destination of the target robot with the destinations of the other objects included in the movement means when the occupation position of the target robot is reset for deboarding of the specific object. This is to ensure that the reset occupation position of the target robot is not included in the deboarding paths of the other objects that deboard before the target robot.

The control unit 150 may compare the deboarding time point of the target robot to the deboarding time points of the other objects, based on the destinations of the other objects positioned in the movement means, as well as the specific object where the deboarding event has occurred.

Further, the control unit 150 may specify the deboarding paths of the other objects when, as a result of the comparison, the deboarding time point of the target robot is later than the deboarding time points of the other objects. Further, the control unit 150 may reset the occupation position to remaining regions excluding the deboarding path of the specific object and the deboarding paths of the other objects.

That is, the control unit 150 may reset the occupation position of the target robot in consideration of all the deboarding paths of the other robots that deboard before the target robot.

When the movement means arrives at the destination of the target robot, the target robot needs to deboard the movement means. In this case, when the movement means arrives at the destination of the target robot, a deboarding event of the target robot may occur.

When the target robot deboards the movement means, in some cases, the movement of other objects included in the movement means may be required. In this case, the control unit 150 may reset the occupation positions of other neighboring robots in order for the target robot to deboard.

The control unit 150 may reset the occupation positions of the other neighboring robots for the deboarding of the target robot based on, i) the battery level of the target robot, ii) the battery level of the neighboring objects (neighboring robots), iii) the shortest distance movement path for deboarding of the target robot, iv) the essential movement path for deboarding of the target robot, v) the time required for completing a mission assigned to the target robot, and the like.

Figure 10A:
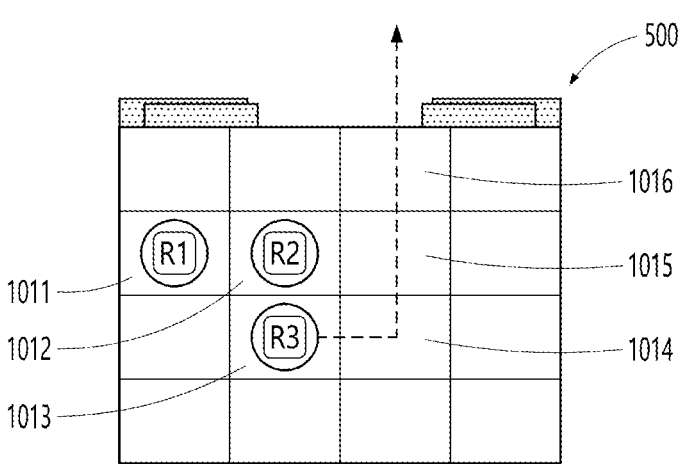

As illustrated in FIG. 10A, when a battery level of the target robot R3 is sufficient, the control unit 150 may not change the occupation positions of the neighboring robots R1 and R2 in order for the target robot R3 to deboard. In this case, the target robot R3 may deboard the movement means 500 through at least three regions 1014, 1015, and 1016.

Figure 10B:
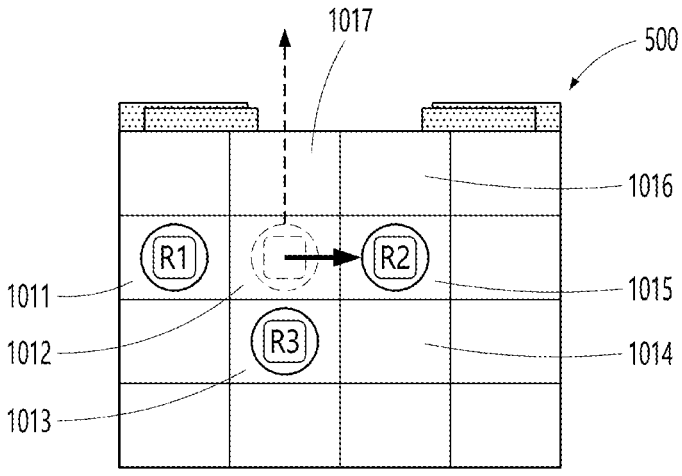

Further, as illustrated in FIG. 10B, when the battery level of the target robot R3 is low, or when the target robot R3 is set to move along the shortest distance movement path, the control unit 150 may reset the occupation position of the neighboring robot R2. The control unit 150 may control the target robot R3 and the neighboring robot R2 such that the target robot R3 deboards the movement means 500 along the shortest distance movement path.

In this case, the target robot R3 may deboard the movement means 500 through two regions 1012 and 1017. In this case, the occupation position of the neighboring robot R2 may be reset.

Figure 11A:
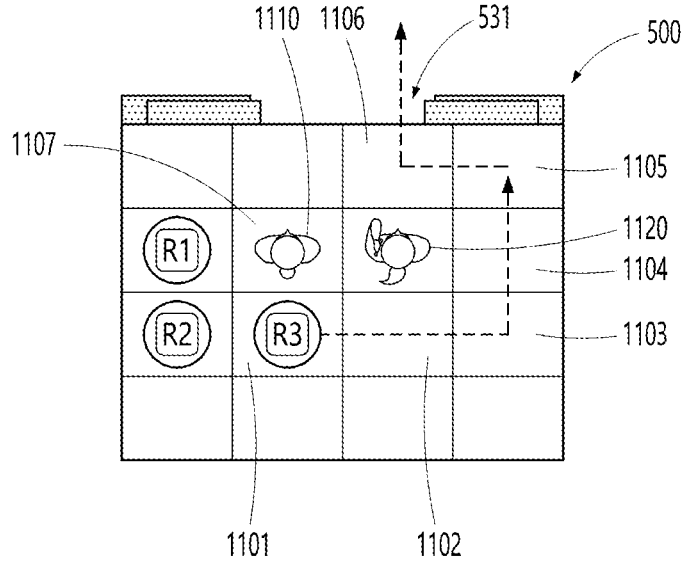
Figure 11B:
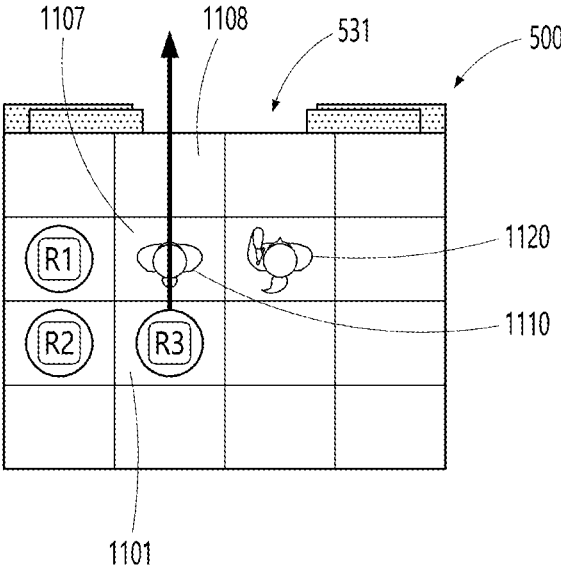

Meanwhile, as illustrated in FIG. 11A and FIG. 11B, there may be a case in which an occupation position of a human 1110 who is not a robot needs to be changed in order for the target robot R3 to deboard along the shortest distance movement path.

For example, as illustrated in FIG. 11A, when the movement of the human does not occur in order for the target robot R3 to deboard, the target robot R3 needs to deboard the movement means 500 through at least five regions 1102, 1103, 1104, 1105, and 1106. However, as illustrated in FIG. 11B, the target robot R3 may deboard the movement means 500 through two regions 1107 and 1108.

Figure 12A:
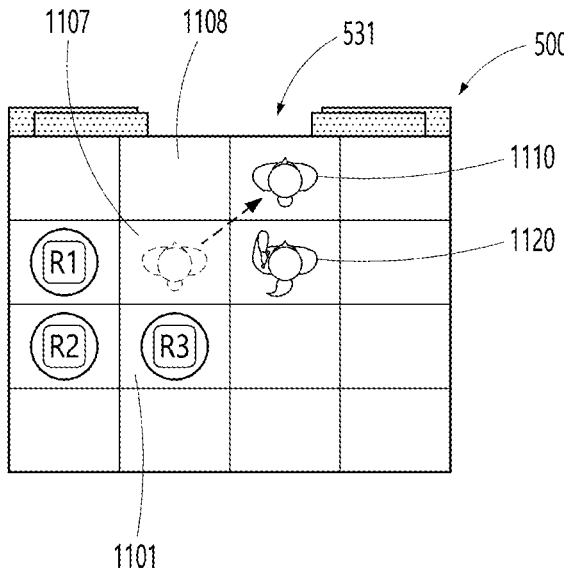
Figure 12B:
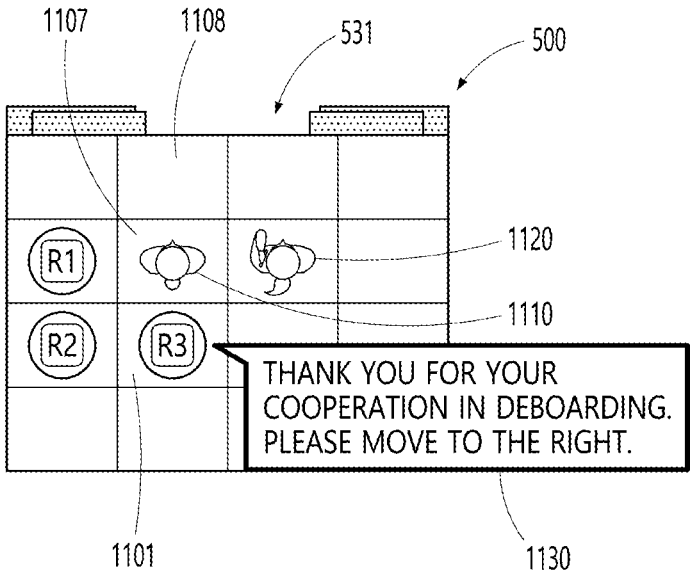

In this case, as illustrated in FIG. 12A, when a specific human 1110 moves from a specific region 1107 included in the shortest distance movement path of the target robot R3 to another region, the target robot R3 may deboard the movement means 500 at the shortest distance. The control unit 150 may determine whether to request for a specific human 1110 to move, based on, i) the battery level of the target robot, ii) the time required to complete a mission assigned to the target robot, or the like. Further, when the control unit 150 determines that a situation exists in which a specific human 1110 needs to move, the control unit 150 may output guidance information 1130 for the movement of the specific human 1110, as illustrated in FIG. 12B. The guidance information may be output in any one of a visual, tactile, or audible manner through an output unit provided on the target robot R3 or the movement means 500.

As described above, a method and a system for remotely controlling a robot according to the present invention can determine the occupation position of a robot within a movement means based on an occupation state of the movement means. More specifically, according to the present invention, a risk of collision with a robot or a human can be reduced by setting an occupation position of the robot such that the occupation position of the robot does not overlap a region occupied by a robot or a human who is already on board the movement means.

Further, the method and system for remotely controlling a robot according to the present invention can set the occupation position of the robot in consideration of the occupation state of the movement means and information on boarding and deboarding of different robots or humans.

In the present invention, energy efficiency of the robot can be maximized by setting an occupation position that allows the robot to move the shortest distance within the movement means to board and deboard the movement means.

In contrast, in the present invention, time efficiency of the robot can be maximized by setting an occupation position that allows the robot to move in the shortest possible time to deboard the movement means.

Furthermore, the method and a system for remotely controlling a robot, according to the present invention, can assist other robots to deboard the movement means while reducing complexity of a movement space by resetting the occupation position of the robot based on deboarding information on the other robots on board the movement means.

The present invention described above may be executed by one or more processes on a computer and implemented as a program that can be stored on a computer-readable medium.

Further, the present invention described above may be implemented as computer-readable code or instructions on a medium in which a program is recorded. That is, the present invention may be provided in the form of a program.

The computer-readable medium includes all kinds of storage devices for storing data readable by a computer system. Examples of computer-readable media include hard disk drives (HDDs), solid state disks (SSDs), silicon disk drives (SDDs), ROMs, RAMs, CD-ROMs, magnetic tapes, floppy discs, and optical data storage devices.

Further, the computer-readable medium may be a server or cloud storage that includes storage and that the electronic device is accessible through communication. In this case, a computer may download the program according to the present invention from the server or cloud storage, through wired or wireless communication.

Further, in the present invention, the computer described above is an electronic device equipped with a processor, that is, a central processing unit (CPU), and is not particularly limited to any type.

It should be appreciated that the detailed description is interpreted as being illustrative in every sense, not restrictive. The scope of the present disclosure should be determined based on the reasonable interpretation of the appended claims, and all of the modifications within the equivalent scope of the present disclosure belong to the scope of the present disclosure.

What is claimed is:

1. A method of remotely controlling a robot, the method comprising:

specifying a target robot for which a boarding event for boarding a movement means has occurred when the target robot is positioned at a specific area outside of the movement means;

controlling the movement means, responsive to the occurrence of the boarding event, to stop at the specific area where the target robot is positioned to enable the target robot to board the moving means;

controlling the target robot to board the movement means;

determining, based on an occupation state of a reception space provided in the movement means and divided into a plurality of predetermined regions, a target occupation position of the target robot in one of the plurality of predetermined regions;

transmitting a control command to the target robot, such that the target robot moves to the determined one of the plurality of predetermined regions corresponding to the target occupation position, wherein the target occupation position varies among the plurality of predetermined regions depending on an operation mode of a plurality of operation modes in which the target robot is operated, and the target robot moves from the determined one of the plurality of predetermined regions to another of the plurality of predetermined regions;

receiving a deboarding event of a specific object positioned in the reception space in a state in which the target robot is positioned at the target occupation position of the reception space;

determining whether the target robot is positioned on a deboarding path of the specific object in response to the deboarding event; and resetting an occupation position of the target robot for deboarding of the specific object from the movement means, when the target robot is positioned on the deboarding path of the specific object, wherein in the determining of the target occupation position, based on a destination of the target robot and a destination of the specific object, a deboarding order of the target robot and the specific object with respect to the movement means is specified, and wherein, based on the deboarding order, whether to set the target occupation position closer to the entrance and exit than the specific object is determined.

2. The method of claim 1, wherein in the determining of the target occupation position, whether the specific object occupying the reception space is present is determined using sensing information sensed through at least one sensor provided in the movement means, and the occupation state is specified, based on whether the object occupying the reception space is present.

3. The method of claim 2, wherein in the determining of the target occupation position, at least some of remaining plurality of predetermined regions of the reception space, excluding a predetermined region occupied by the specific object when the specific object is determined to be present, is determined to be the target occupation position of the target robot, such that the target robot is not positioned to overlap the predetermined region occupied by the specific object in the reception space.

4. The method of claim 3, wherein a size of the predetermined region occupied by the specific object is differently specified based on an object type of the specific object, wherein the object type comprises a first type and a second type, wherein an object according to the first type corresponds to a robot that is remotely controllable, and wherein an object according to the second type corresponds to an object that is not remotely controllable.

5. The method of claim 4, wherein a size of a predetermined region occupied by the object according to the second type is larger than a size of a predetermined region occupied by the object according to the first type.

6. The method of claim 2, wherein in the determining of the target occupation position, when the specific object occupying the reception space is present, the destination of the object is identified, and the target occupation position is determined, based on the destination of the object.

7. The method of claim 1, wherein a first operation mode of the plurality of operation modes is an operation mode that prioritizes time efficiency of the target robot, and

wherein a second operation mode of the plurality of operation modes is an operation mode that prioritizes energy efficiency of the target robot.

8. The method of claim 7, wherein in the determining of the target occupation position, when the target robot is operated in the first operation mode, a region that is closest to the entrance and exit of the movement means among occupiable plurality of predetermined regions of the reception space is determined as the target occupation position, and wherein when the target robot is operated in the second operation mode, in consideration of the destinations of the specific object positioned in the reception space, the target occupation position is determined.

9. The method of claim 1, wherein the reset occupation position of the target robot is set to a position that is closest to the entrance and exit of the movement means among remaining plurality of predetermined regions of the reception space, excluding the deboarding path.

10. The method of claim 1, further comprising:

comparing, based on destinations of other objects positioned in the movement means, time of deboarding of the other objects to a time point of deboarding of the target robot; and specifying deboarding of the other objects when the time point of deboarding of the target robot is later than the time points of deboarding of the other objects as a result of the comparison, and wherein the reset occupation position is positioned in remaining regions excluding the deboarding path of the specific object and the deboarding paths of the other objects.

11. A system for remotely controlling a robot and a movement means, the system comprising:

a sensing unit for determining a location of the robot;

a communication unit for communicating the location of the robot; and a control unit configured to specify a target robot for which a boarding event for boarding a movement means has occurred when the target robot is positioned at a specific area outside of the movement means; and a movement means controller, in communication with the control unit, for controlling the movement means, wherein the movement means controller controls the movement means, responsive to the occurrence of the boarding event, to stop at the specific area where the target robot is positioned to enable the target robot at a specific area to board the moving means, and wherein the control unit is configured to:

control the target robot to board the movement means;

determine, based on an occupation state of a reception space provided in the movement means and divided into a plurality of predetermined regions, a target occupation position of the target robot in one of the plurality of predetermined regions;

transmit a control command to the target robot using the communication unit, such that the target robot moves to the determined one of the plurality of predetermined regions corresponding to the target occupation position, wherein the target occupation position varies among the plurality of predetermined regions depending on an operation mode of a plurality of operation modes in which the target robot is operated, and the target robot moves from the determined one of the plurality of predetermined regions to another of the plurality of predetermined regions;

receive, through the communication unit, a deboarding event of a specific object positioned in the reception space in a state in which the target robot is positioned at the target occupation position of the reception space;

determine whether the target robot is positioned on a deboarding path of the specific object in response to the deboarding event; and reset an occupation position of the target robot for deboarding of the specific object from the movement means, when the target robot is positioned on the deboarding path of the specific object, wherein in the determining of the target occupation position, based on a destination of the target robot and a destination of the specific object, a deboarding order of the target robot and the specific object with respect to the movement means is specified, and wherein, based on the deboarding order, whether to set the target occupation position closer to the entrance and exit than the specific object is determined.

12. The method of claim 11, wherein in the determining of the target occupation position, whether the specific object occupying the reception space is present is determined using sensing information sensed through at least one sensor provided in the movement means, and the occupation state is specified, based on whether the object occupying the reception space is present.

13. The method of claim 12, wherein in the determining of the target occupation position, at least some of remaining plurality of predetermined regions of the reception space, excluding a predetermined region occupied by the specific object when the specific object is determined to be present, is determined to be the target occupation position of the target robot, such that the target robot is not positioned to overlap the predetermined region occupied by the specific object in the reception space.

14. The method of claim 13, wherein a size of the predetermined region occupied by the specific object is differently specified based on an object type of the specific object, wherein the object type comprises a first type and a second type, wherein an object according to the first type corresponds to a robot that is remotely controllable, and wherein an object according to the second type corresponds to an object that is not remotely controllable.

15. The method of claim 14, wherein a size of a predetermined region occupied by the object according to the second type is larger than a size of a predetermined region occupied by the object according to the first type.

16. The method of claim 12, wherein in the determining of the target occupation position, when the specific object occupying the reception space is present, the destination of the object is identified, and the target occupation position is determined, based on the destination of the object.

17. The method of claim 11, wherein a first operation mode of the plurality of operation modes is an operation mode that prioritizes time efficiency of the target robot, and wherein a second operation mode of the plurality of operation modes is an operation mode that prioritizes energy efficiency of the target robot.

18. The method of claim 17, wherein in the determining of the target occupation position, when the target robot is operated in the first operation mode, a region that is closest to the entrance and exit of the movement means among occupiable plurality of predetermined regions of the reception space is determined as the target occupation position, and wherein when the target robot is operated in the second operation mode, in consideration of the destinations of the specific object positioned in the reception space, the target occupation position is determined.

19. The method of claim 11, wherein the reset occupation position of the target robot is set to a position that is closest to the entrance and exit of the movement means among remaining plurality of predetermined regions of the reception space, excluding the deboarding path.

20. The method of claim 11, further comprising:

comparing, based on destinations of other objects positioned in the movement means, time of deboarding of the other objects to a time point of deboarding of the target robot; and specifying deboarding of the other objects when the time point of deboarding of the target robot is later than the time points of deboarding of the other objects as a result of the comparison, and wherein the reset occupation position is positioned in remaining regions excluding the deboarding path of the specific object and the deboarding paths of the other objects.

* * * * *